Patented June 19, 1945

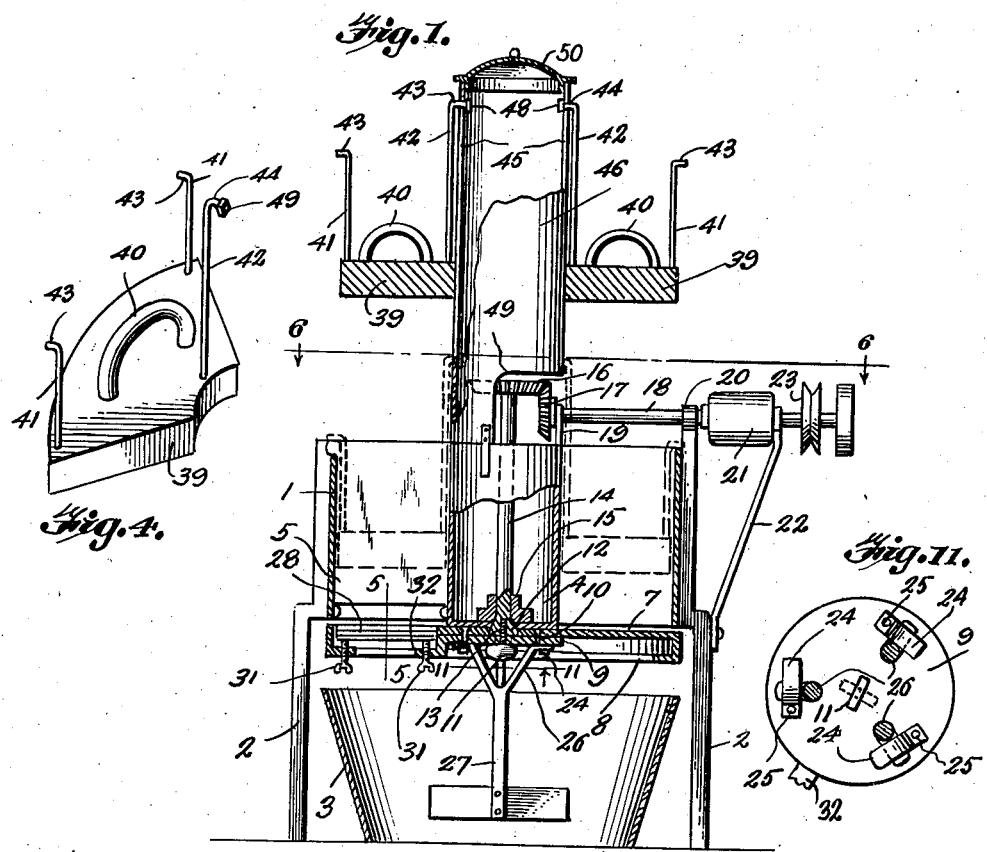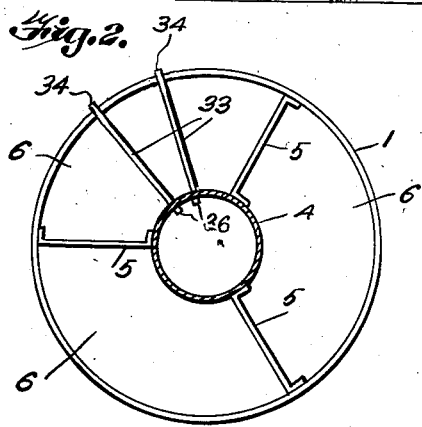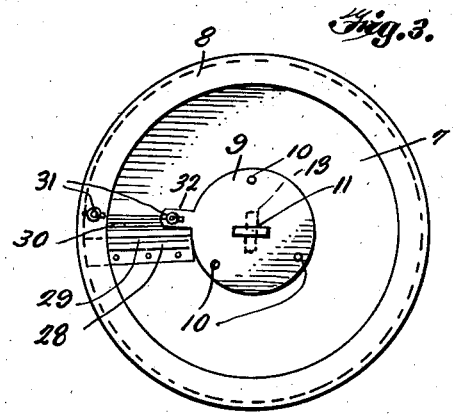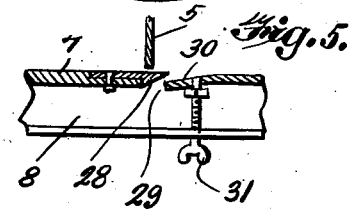

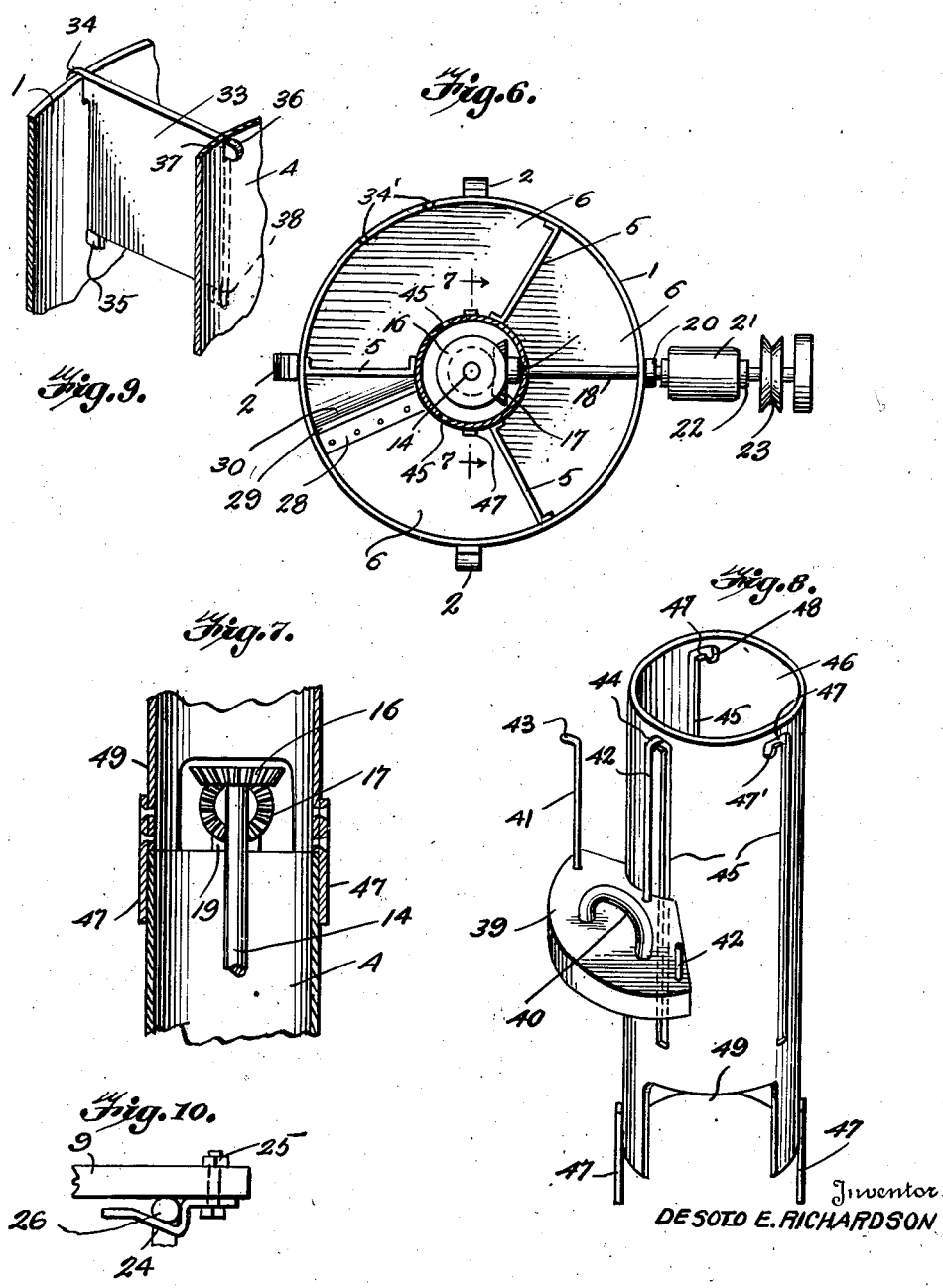

2,378,502

UNITED STATES PATENT OFFICE 2,378,502

FRUIT AND VEGETABLE SLICER

De Soto E. Richardson, Wenatchee, Wash.

Application January 7, 1944, Serial No. 517,445

4 Claims. (Cl. 146—125)

This invention relates to a machine for cutting or shredding fruit and vegetables and it is one object of the invention to provide a machine by means of which fruit or vegetables may be placed in a drum or container where they are pressed against a rotatable disk constituting a bottom for the drum and carrying a blade which slices the fruit or vegetables as the disk rotates.

Another object of the invention is to provide the disk with a portion adjacent the blade which is vertically adjustable so that the thickness of slices cut by the blade may be controlled.

Another object of the invention is to provide a machine of this character wherein the bottom disk is removably secured to the lower end of a vertically disposed rotary shaft, thus permitting the disk to be easily removed when the machine is to be cleaned.

Another object of the invention is to provide a mixer carried by the bottom disk in axial alinement with the vertical shaft and extending downwardly from the disk for stirring sliced or shredded fruit or vegetables in a receptacle resting on a table under the disk.

Another object of the invention is to provide the drum with partitions extending radially thereon between the wall of the drum and a vertically disposed column or shaft housing and dividing the drum into sections or chambers for receiving the fruit or vegetables which are pressed downwardly by weights having upstanding rods for guiding their vertical movement and also limiting downward movement of the weights and releasably supporting the weights in a raised position when filling the drum.

Another object of the invention is to provide a vertically disposed shaft housing or column having its upper portion so mounted that it may be removed when desired.

In the accompanying drawings:

Fig. 1 is a view showing the improved machine in vertical section.

Fig. 2 is a top plan view of the drum, the vertical shaft housing being in transverse section.

Fig. 3 is a bottom plan view of the disk serving as a bottom for the drum and carrying a cutting blade.

Fig. 4 is a perspective view of a weight.

Fig. 5 is a fragmentary sectional view taken through the disk on the line 5—5 of Fig. 1.

Fig. 6 is a view on the line 6—6 of Fig. 1.

Fig. 7 is a view showing a portion of the shaft housing in vertical section on the line 7—7 of Fig. 6.

Fig. 8 is a perspective view of the upper section of the shaft housing or column.

Fig. 9 is a perspective view illustrating the manner in which temporary partitions are mounted in the drum.

Fig. 10 is a fragmentary view illustrating the manner in which the agitator is mounted under the disk.

Fig. 11 is a fragmentary view on the line 11—11 of Fig. 1.

This improved fruit and vegetable slicing machine has a drum or container 1 which is cylindrical in shape and open at its upper and lower ends. Standards or legs 2 have been shown as means for supporting the drum in an elevated position with respect to a table or other surface upon which the legs rest, and referring to Fig. 1, it will be seen that upper portions of the legs are secured flat against the annular wall of the drum but their lower portions are offset outwardly in order to provide more room under the drum to accommodate a receptacle 3 in which sliced fruit or vegetables drop. A cylindrical column 4 extends vertically in the drum, centrally thereof, and is supported by plates 5 which extend between the column and the wall of the drum radially thereof and divide the drum into a plurality of compartments or chambers 6 to receive fruit or vegetables. The plates or partitions 5 are firmly secured along their inner and outer edges and serve to support the column concentric to the drum, as shown in Figs. 2 and 6.

In order to support fruit or vegetables in the drum, there is provided a disk 7 which is formed of strong metal and of circular outline, marginal portions of the disk being extended downwardly to form an inturned flange 8 which reinforces the disk. A plate 9 is disposed flat against the under face of the central portion of the disk and formed with openings to receive pins 10 carried by the disk and this plate is held in place by a screw 11 which is passed upwardly through the center of the disk and screwed into a socket 12 formed in the enlarged lower end portion 13 of a shaft 14. The enlarged end portion 13 of the shaft is of rectangular cross section so that, as the shaft is turned, the disk and plate will turn therewith. A bearing 15 is provided for the shaft which is disposed axially of the column and, at its upper end, the shaft carries a beveled gear 16 meshing with a companion gear 17 carried by a drive shaft 18. This drive shaft extends radially of the drum and is rotatably mounted through bearings 19 and 20 and, in order to rotate the drive shaft, there has been provided a motor 21 carried by a bracket 22. The shaft of the motor projects outwardly therefrom and carries a pulley 23 serving as a power take-off. It will be understood that, if desired, the motor 21 may be eliminated and the shaft driven from a suitable driver through means of a belt trained about a pulley carried by the shaft. Clips 24 of resilient metal are secured against the under face of plate 9 by bolts 25 for engaging arms 26 at the upper end of the shank of an agitator 27, and from an inspection of Fig. 1, it will be seen that during operation of the machine, the agitator will be turned with the shaft 14 and serve to stir the contents of the receptacle 3. When the agitator is not needed, it may be easily detached by slipping ends of the arms from engagement by the clips 24 or by loosening the bolts 25 and swinging the clips out of engagement with the arms of the agitator.

During rotation of the disk, fruit or vegetables placed in the drum are to be sliced and in order to do this, there has been provided a blade 28 which is secured against the upper face of the disk and extends along a side edge of a slot 29 formed radially of the disk. The blade extends across the slot, as shown in Fig. 5, and overlaps the portions 30 of the disk at the opposite side of the slot. This portion 30 of the disk is engaged by set screws 31 which are threaded upwardly through the flange 8 and a tongue 32 projecting from the plate 9, and by adjusting the screws the portion 30 may be shifted vertically and control the thickness of slices cut by the blade during turning of the disk. Any tendency of the fruit or vegetables to move with the disk will be overcome by the partitions 5 and, since the drum is divided into a number of compartments 6 by the partitions, a quantity of material less than its full capacity may be placed in one or more compartments and the material in a compartment will be prevented from moving with the disk by the partitions which serve as barriers.

In order that smaller quantities of fruit or vegetables may be sliced in the machine, there have been provided auxiliary partitions 33 which are temporarily fitted into the drum radially thereof and have their outer side edges supported by tongues 34 engaged in notches 34' and by lugs 35. At their inner side edges the partitions are formed with lugs or tongues 36 for engaging through openings 37 formed in the column 4. Lower ends of the inner side edges of the auxiliary partitions rest upon lugs 38. By this arrangement, the auxiliary partitions will be firmly supported when in place but they may be very easily removed when not needed.

During operation of the machine, the fruit or vegetables may be pressed downwardly against the bottom or disk 7. This is accomplished by weights 39. These weights are formed of heavy metal, such as iron, and are of arcuate formation so that they will fit within the chambers 6. Each weight is provided with a handle 40 by which it is to be lifted when inserted or removed and each weight is also provided with rods 41 and 42, the rods 41 constituting stops for limiting downward movement of the weights and having hooks 43 at their upper ends for overlapping engagement with the upper edge of the annular wall of the drum or container 1. The upper ends of rods 42 are also bent to form fingers 44 which operate in slots 45 formed vertically in an upper section 46 of the column 4. This upper section 46 rests upon the upper end of the column 4 and is held against transverse movement out of place thereon by strips 47 carried by and depending from the upper section, as shown in Figs. 7 and 8. The upper section has been formed separate from the column 4 in order that it may be removed when the machine is not in use, it being understood that the column and its upper section may be formed as a single unit if desired. Upper ends of the slots 45 have side extensions 47 to receive the fingers so that the weights may be supported in an elevated position while filling the drum with fruit or vegetables to be sliced, and the side extensions 47 terminate in enlargements 47' in order that the nuts 48 forming heads or stops for the fingers may be passed through the slots. It will thus be seen that the fingers may be engaged in the slots and removed therefrom and that when the rods 42 are shifted transversely in the extensions 47 they may seat in the enlarged end portions of the side extensions and support the weights in raised position without danger of the weights accidentally falling from elevated position. The rods 42 serve very effectively to guide downward movement of the weights and cooperate with the hooks 43 to support the weights when in their lowermost position. An opening 49 is formed in the upper section of the column in order that access may be had to the shafts and gears carried thereby and the upper end of the upper section is closed by a cover 50 removably applied thereto. A shredding blade may be substituted for the blade 28 if so desired.

Having thus described the invention, what is claimed is:

1. A machine of the character described comprising a drum supported in elevated position, a cylindrical column mounted vertically in said drum concentric thereto, a rotary shaft disposed vertically in said column centrally thereof, a disk forming a bottom for said drum and provided with a radially extending opening and a blade along a side of said opening, the portion of the disk along the other side of the opening being bent downwardly and overlapped by the blade, a plate against the under face of the central portion of said disk, a threaded fastener passing through the center of said plate and screwed into the lower end of said shaft, a depending flange carried by said disk, an ear extending laterally from said plate, set screws threaded through the flange and the ear and engaging the downwardly bent portion of the bottom for flexing the same upwardly and controlling the thickness of material cut by the blade, and means for rotating said shaft.

2. A machine of the character described comprising a drum supported in elevated position, a cylindrical column mounted vertically in the drum concentric thereto, a rotary shaft disposed vertically in said column centrally thereof, a disk forming a bottom for said drum, said disk being formed with a center opening receiving the lower end of said shaft, a plate secured against the under face of the central portion of said disk, a fastener passing through the plate and screwed into the lower end of said shaft to detachably hold the plate and disk in place for turning with the shaft, clips carried by said plate against the under face thereof, an agitator disposed vertically under said plate and having arms at its upper end terminating in fingers engaged between the clips and plate and detachably mounting the agitator, and means for rotating said shaft.

3. A machine of the character described comprising a drum supported in elevated position, a cylindrical column mounted vertically in the drum concentric thereto, a rotary shaft disposed vertically in said column centrally thereof, a disk forming a bottom for said drum, said disk being formed with a center opening receiving the lower end of said shaft, a plate against the under face of the central portion of said disk and held against turning relative thereto, a fastener passing through said plate and engaging said shaft to firmly hold the plate in detachable engagement with the disk and cause the disk and the plate to turn with the shaft, an agitator under said plate detachably connected therewith and extending downwardly for operating in a container place under the disk, and means for rotating said shaft.

4. A machine of the character described comprising a drum, a cylindrical column mounted vertically in said drum concentric thereto, a rotary shaft disposed vertically in said column centrally thereof, a disk forming a bottom for said drum and provided with a radially extending opening between the column and the outer periphery of the disk, a blade along one side of said opening, a lip along the other side of the opening extending downwardly at a transverse incline, said disk being formed with a center opening receiving the lower end of said shaft, a plate secured against the under face of the center portion of said disk, screws carried by said disk and said plate for engaging the under face of said lip and flexing the lip upwardly for controlling the thickness of material sliced by said blade as the disk is turned, a fastener passed through said plate and screwed into the lower end of said shaft, means in the drum between its walls and said column for holding material in the drum against movement with said disk, and means for rotating said shaft.

DE SOTO E. RICHARDSON.